E. T. THOMAS.
DEVICE FOR RUNNING ON BELTS TO MACHINERY.
No. 173,871. Patented Feb. 22, 1876.
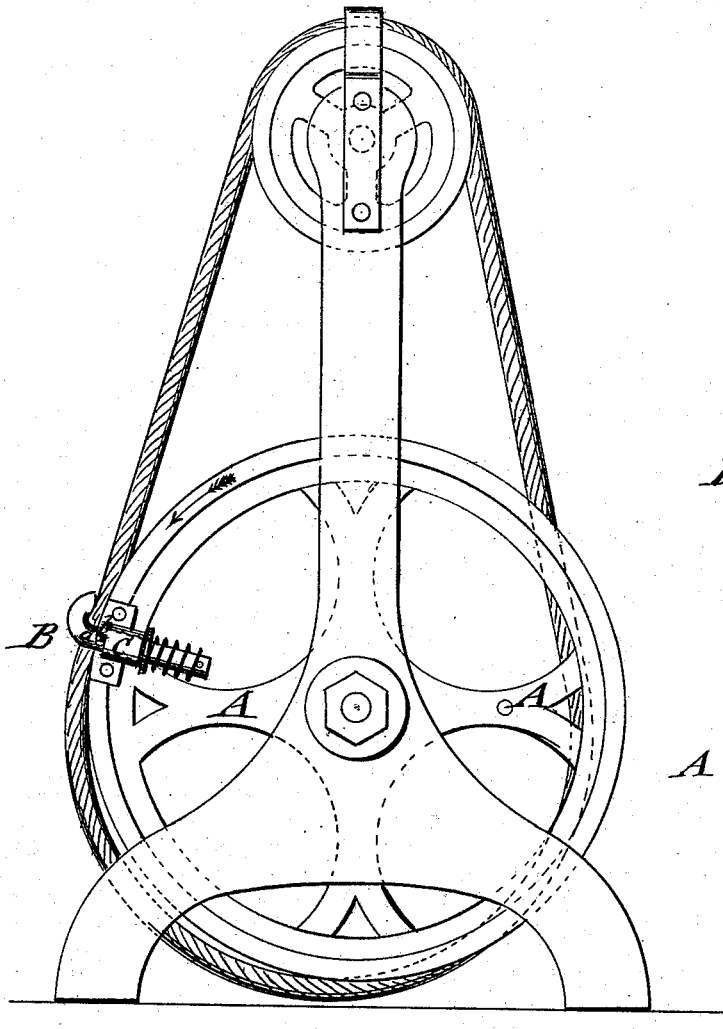
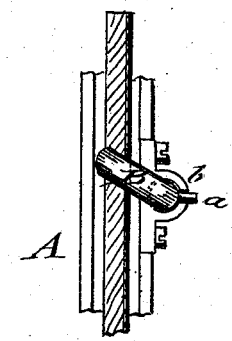
WITNESSES:
E. Wolff.
Alex F. Roberts
INVENTOR:
E. T. Thomas
BY
ATTORNEYS.

UNITED STATES PATENT OFFICE.

EDDY T. THOMAS, OF BOSTON, MASSACHUSETTS.

IMPROVEMENT IN DEVICES FOR RUNNING ON BELTS TO MACHINERY.

Specification forming part of Letters Patent No. 173,871, dated February 22, 1876; application filed October 16, 1875.

*To all whom it may concern:*

Be it known that I, EDDY T. THOMAS, of Boston, in the county of Suffolk and State of Massachusetts, have invented a new and Improved Device for Running on Belts to Machinery, of which the following is a specification:

In the accompanying drawing, Figure 1 represents a side view of a driving-wheel with my device for running on the belt attached thereto, and Fig. 2 is an end view of the device.

Similar letters of reference indicate corresponding parts.

My invention relates to a device by which belts may be run on the wheels of sewing and other machines in a quick and easy manner without the exertion of bending down and carrying the belt with the hand around the wheel to the other side.

The invention consists of a spring hook or button that slides in a socket at the circumference of the driving-wheel, and swings over the belt, so as to retain the same until run on the wheel, being then thrown off by the belt.

In the drawing, A represents a wheel of a sewing-machine, foot-lathe, jigger-saw, or any other machinery on which a driving-belt is used to transmit power. A spring-acted hook or button, B, slides in a socket, C, applied at the circumference of the wheel, so that the hook or button may be swung over the groove of the wheel. A stop-pin, *a*, of the hook comes in contact with a shoulder, *b*, of the socket, and retains thereby the hook in the desired position over the groove.

For running on the belt, the hook is turned over the belt, after the same is placed at that point in the groove of the wheel. The wheel is then turned, and the hook runs the belt on in the same manner as by hand. When the belt is placed entirely on the wheel, the pressure of the same on the spring-hook at the point where the belt runs off in tangential direction to the wheel to be driven, throws off the hook in automatic manner.

The stop-pin and shoulder have to be so arranged that the hook may be turned over the belt only so far that the strain thereon will produce the ready throwing off of the hook.

The spring of the hook serves to hold the belt tightly in the groove, and allows the hook "to give" to the strain of the belt at the moment of being thrown off. Thus a simple and convenient device for applying belts to wheels is furnished, which accomplishes the object quickly and easily.

The same effect can also be obtained with sewing-machines and other cases provided with a guard or shield around part of the grooved wheel for preventing the dress from coming in contact with the same, by casting on the wheel at the side of the groove opposite to that covered by the guard, a projection or lug that answers the same purpose as the button. The guard prevents the band from falling away from the wheel while the projection throws the belt into the groove the same as the button. This is accomplished by throwing the band toward the side on which the projection is arranged on the wheel.

Having thus described my invention, I claim as new and desire to secure by Letters Patent—

A device for running on belts to driving-wheels of machinery, composed of a sliding and turning spring hook or button swinging over the groove of the wheel, substantially in the manner and for the purpose set forth.

E. T. THOMAS.

Witnesses:
ARTHUR A. WALTERS,
JOHN MURPHY.